United States Patent
Stewart

(10) Patent No.: US 7,574,142 B2
(45) Date of Patent: Aug. 11, 2009

(54) COMMUNICATIONS SYSTEM

(75) Inventor: William James Stewart, Blakesley (GB)

(73) Assignee: Ericsson AB, Stockholm (SE)

( * ) Notice: Subject to any disclaimer, the term of this patent is extended or adjusted under 35 U.S.C. 154(b) by 479 days.

(21) Appl. No.: 10/559,635

(22) PCT Filed: Jun. 4, 2003

(86) PCT No.: PCT/GB03/02441

§ 371 (c)(1),
(2), (4) Date: Jun. 2, 2006

(87) PCT Pub. No.: WO2004/109960

PCT Pub. Date: Dec. 16, 2004

(65) Prior Publication Data
US 2006/0269289 A1   Nov. 30, 2006

(51) Int. Cl.
H04B 10/00 (2006.01)
(52) U.S. Cl. .................... 398/154; 398/95; 398/98
(58) Field of Classification Search .......... 398/91–99, 398/140, 154
See application file for complete search history.

(56) References Cited

U.S. PATENT DOCUMENTS

| | | | |
|---|---|---|---|
| 5,815,294 A | 9/1998 | Ishikawa et al. | |
| 5,995,256 A * | 11/1999 | Fee | 398/34 |
| 6,028,697 A | 2/2000 | Lee | |
| 6,141,127 A | 10/2000 | Boivin et al. | |
| 6,282,214 B1 | 8/2001 | Goto et al. | |
| 6,292,282 B1 | 9/2001 | Mossberg et al. | |
| 6,324,204 B1 | 11/2001 | Deacon | |
| 6,388,782 B1 * | 5/2002 | Stephens et al. | 398/79 |
| 7,174,100 B1 * | 2/2007 | Wachsman | 398/47 |
| 2002/0021861 A1 * | 2/2002 | Gnauck et al. | 385/24 |

FOREIGN PATENT DOCUMENTS

| | | |
|---|---|---|
| EP | 0 295 857 A1 | 12/1988 |
| EP | 0 667 695 A1 | 8/1995 |
| JP | 58066444 | 4/1983 |
| WO | WO 98/15860 | 4/1998 |

* cited by examiner

Primary Examiner—Dzung D Tran
(74) Attorney, Agent, or Firm—Kirschstein, et al.

(57) ABSTRACT

In a telecommunication system, channels of information are modulated onto respective carriers that are swept repeatedly across a frequency range in a time-staggered fashion so that, at any one time each carrier is at a different frequency. The carriers are multiplexed onto a single communications link and separated, on reception, by filters swept in synchronism so as to de-multiplex the signals.

3 Claims, 4 Drawing Sheets

COMMUNICATIONS SYSTEM

This invention relates to a communications system.

In present times, in research, single optical fibre data capacities are approaching 10 Terabits/sec. About 1995 the rate achieved exceeded that which could be generated as a single TDM (time division multiplexed) channel. This was so for a variety of electronic and optical reasons. This limitation was avoided by WDM (wavelength division multiplexing), i.e. by running a series of separate optical channels on different optical frequencies (/wavelengths) generated by different (laser) sources, much as in radio. The transmission in a single fibre can then be represented as shown in FIG. 1. In FIG. 1, the vertical axis represents optical wavelength (/frequency), the horizontal axis represents time, and the 'dashes' represent information bits. The figure is not to scale. The single line of information bits between the two dotted lines a, b constitutes one TDM channel. Note that the channels are generally asynchronous, which may be desirable (to minimize non-linear cross-talk) but is not necessary.

WDM transmission is used by almost all current systems and is generally fairly satisfactory (though there continues to be, amongst other things, growth in the individual channel data rate and in the packing density of the channels in optical frequency space). However, for more recent and generally shorter adaptable multi-terminal networks where there is a need to re-arrange data between channels, and to re-arrange the connection pattern of channels, WDM as presently implemented has some limitations, particularly: (i) traditional optical sources are fixed in optical frequency, which gives rise to the problem of lack of flexibility, and creates an inventory problem with the requirement to stock hundreds of different laser types; (ii) it is difficult and expensive to change the optical carrier frequency of a signal (compared with the corresponding TDM operation which just requires that the signal be delayed). The first limitation is being addressed by the growing availability of fast tunable laser sources. In addition to addressing the first issue above, this opens up the possibility of making systems that are 'optical wideband' (as opposed to electrical wideband) in the sense that a channel covers more optical spectrum than could be addressed by electrical modulation. For example a laser tuning range might be 40 nm (5300 GHz) compared with about 50 GHz maximum TDM modulation (or detection) rate.

According to the present invention there is provided a communications system comprising: a plurality of tunable signal sources, each for generating a carrier signal of any one of a plurality of wavelengths; first control means for controlling said signal sources so as to sweep the wavelength of the carrier signal generated by each source through said plurality of wavelengths, said first control means sweeping the signal sources in staggered manner so that at any point in time the sources are generating different wavelength signals; a plurality of modulators, each for modulating information onto the swept carrier signal generated by a respective said signal source; means for combining the swept modulated signals and transmitting the combined signal; means for filtering the received combined signal to extract therefrom a plurality of component signals, a component signal being extracted at each of said plurality of wavelengths; second control means for controlling said filtering means so as to sweep the wavelength of each component signal extracted through said plurality of wavelengths, said second control means sweeping the wavelengths of the component signals in staggered manner in synchronism with said sweeping of the signal sources by said first control means, the wavelength of each component signal thereby tracking the wavelength generated by a respective said tunable signal source; and a plurality of demodulators, each for demodulating a respective said component signal provided by said filtering means thereby to recover the said information contained therein.

Preferably, in the communications system according to the previous paragraph: said means for filtering comprises a plurality of tunable filters, each for filtering the received combined signal to extract a said component signal at one of said plurality of wavelengths; said second control means controls said tunable filters so as to sweep the wavelength of the signal component extracted by each filter through said plurality of wavelengths, said second control means sweeping the filters in said staggered manner in synchronism with said sweeping of the signal sources by said first control means, each said tunable filter thereby tracking the wavelength generated by a respective said tunable signal source; and each of said plurality of demodulators demodulates the signal provided by a respective said tunable filter thereby to recover the said information contained therein.

The invention will now be described, by way of example, with reference to the accompanying drawings, in which:

FIG. 1, already referred to, and illustrative of the prior art, shows WDM;

Figure 2:
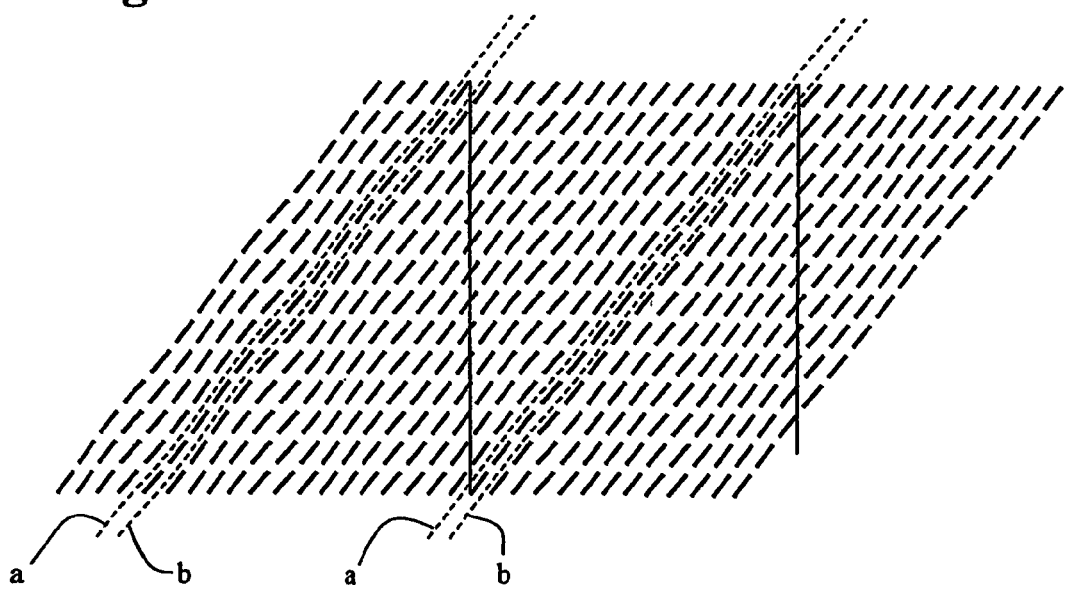
FIG. 2 illustrates modulation according to the present invention.
Figure 6:
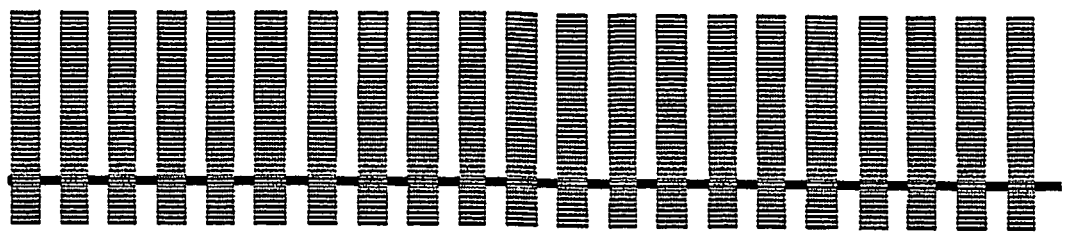
Figure 7:
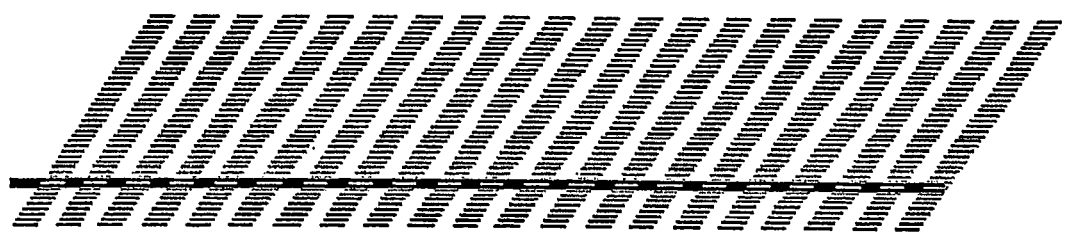
Figure 8:
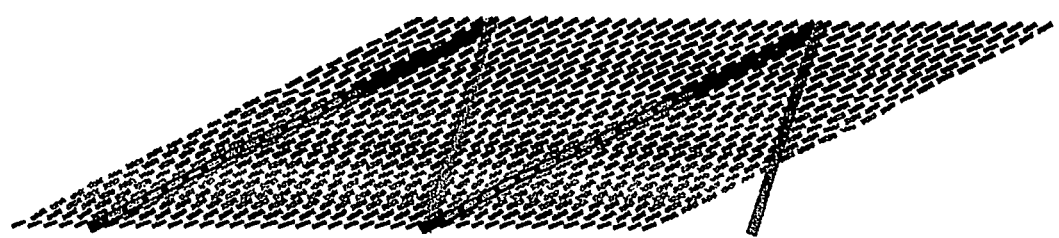

FIG. 6, illustrative of the prior art, shows synchronous WDM;

FIG. 7, also illustrative of the prior art, shows the effect of dispersion on the synchronous WDM of FIG. 6; and FIG. 8 shows the effect of dispersion on the modulation according to the present invention shown in FIG. 2.

Figure 1:
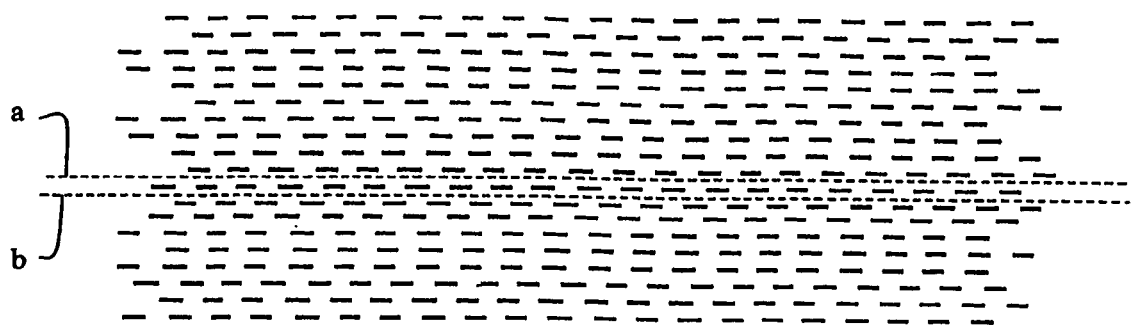

Referring to FIG. 2, in accordance with the present invention, the optical carrier for each channel is not single-optical-frequency as in WDM but swept across the available tuning band with a saw-tooth pattern. As in FIG. 1, in FIG. 2 the vertical axis represents optical wavelength (/frequency), the horizontal axis represents time, the 'dashes' represent information bits, and the single line of information bits between the two dotted lines a, b constitutes one TDM channel. It can be seen that instantaneously this is the same as WDM, but the bits are strung together differently. The diagram implies some time synchronism between channels but as with WDM this is not necessary.

The modulation scheme requires a tunable source at each transmit terminal and a tunable detector at each receive terminal. However, such may already be present to address limitation (i) mentioned in the introduction.

It can be seen that the desirable result has been achieved of making any two channels purely delay-related, without requiring a 10 Terabit TDM signal. This makes switching data between channels a purely linear (optical) operation requiring a switched delay line. This is to be compared to the non-linear methods currently required to accomplish wavelength conversion. A further advantage is that all sources/detectors are physically identical. Additionally, in the prior art in WDM, the practice of locking tunable lasers to the required grid, whilst possible, is nontrivial. In the modulation of the present invention, this requirement is largely replaced by the much simpler requirement to lock the saw-tooth waveforms of different terminals to a common clock.

Figure 3:
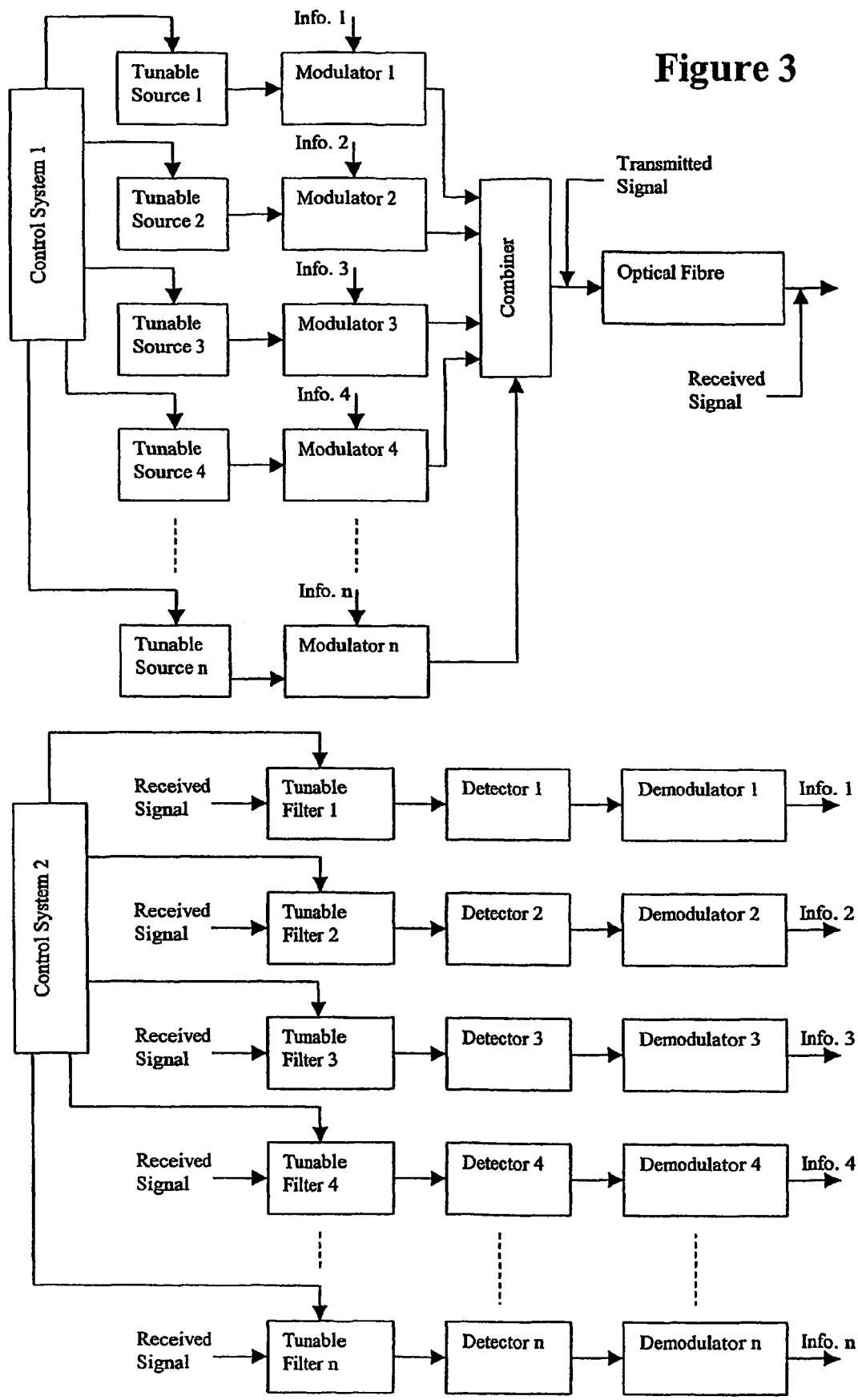
FIG. 3 is a block schematic diagram of a communications system suitable for implementing the modulation shown in FIG. 2.
Figure 4:
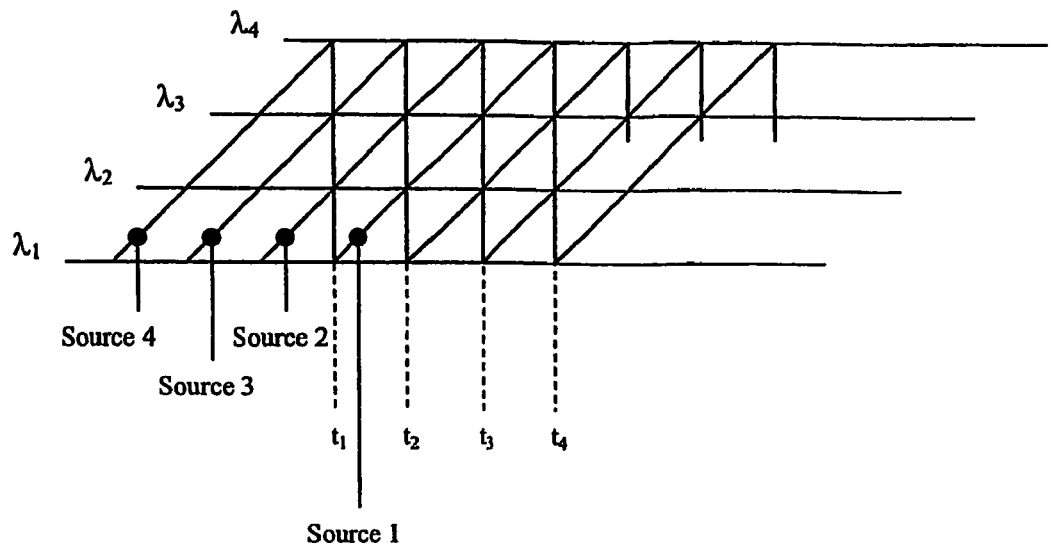
FIG. 4 illustrates an aspect of operation of the communications system of FIG. 3.

Referring to FIG. 3, each tunable source 1 to n is capable of generating a carrier signal of any one of a range of wavelengths λ1, λ2, λ3, λ4, . . . λn. Control system 1 sweeps each tunable source through this range of wavelengths. This it does in staggered manner so that at any given time all sources are generating different wavelengths. Consider the following example. At time t1 tunable source 1 is generating λ1, source 2 is generating λ2, source 3 is generating λ3, source 4 is generating λ4, . . . source n is generating λn (in fact, source n will be generating λn just before time t1, and at time t1 source n will fly-back to generate just after time t1 wavelength λ1). At time t2 source 1 would move on in its sweep to generate λ2, source 2 to generate λ3, source 3 to generate λ4, source 4 to generate λ5, . . . source n−1 to generate λn (in fact, source n−1 will be generating λn just before time t2, and at time t2 source n−1 will fly-back to generate just after time t2 wavelength λ1), source n will move on in its sweep to generate λ2. At time t3 source 1 would move on in its sweep to generate λ3, source 2 to generate λ4, source 3 to generate λ5, source 4 to generate λ6, . . . source n−2 to generate λn (in fact, source n−2 will be generating λn just before time t3, and at time t3 source n−2 will fly-back to generate just after time t3 wavelength λ1), source n−1 will move on in its sweep to generate λ2, source n to generate λ3. The aforesaid example sweeping is illustrated in the graph of FIG. 4 for the case of four tunable sources and four wavelengths.

The swept carrier signal generated by each tunable source is modulated with information to be transmitted by a respective modulator. Thus, the swept modulated signal provided by modulator 1 can be termed information 1 on channel 1, the signal provided by modulator 2 can be termed information 2 on channel 2, etc.

The swept modulated signals are combined by the combiner and launched as a combined transmitted signal into the optical fibre.

The signal received from the fibre passes to all tunable filters 1 to n. Each tunable filter is capable of filtering the received signal to extract a component of the signal at any one of the aforesaid range of wavelengths λ1 to λn. Control means 2 sweeps each tunable filter through range of wavelengths λ1 to λn. This it does in staggered manner in synchronism with the sweeping of tunable sources 1 to n by control system 1. It does this so that each tunable filter 1 to n tracks the carrier wavelength generated by a respective corresponding tunable source 1 to n, i.e. tunable filter 1 tracks the carrier wavelength generated by tunable source 1, filter 2 tracks source 2, etc.

Each detector 1 to n detects the optical power of the signal provided by a respective tunable filter 1 to n. Each demodulator 1 to n demodulates the signal provided by a respective detector 1 to n to recover the information contained therein. Thus, since tunable filter 1 tracked tunable source 1 and hence channel 1, demodulator 1 will provide information 1. Similarly, since tunable filter 2 tracked tunable source 2 and hence channel 2, demodulator 2 will provide information 2, and so on.

Figure 5:
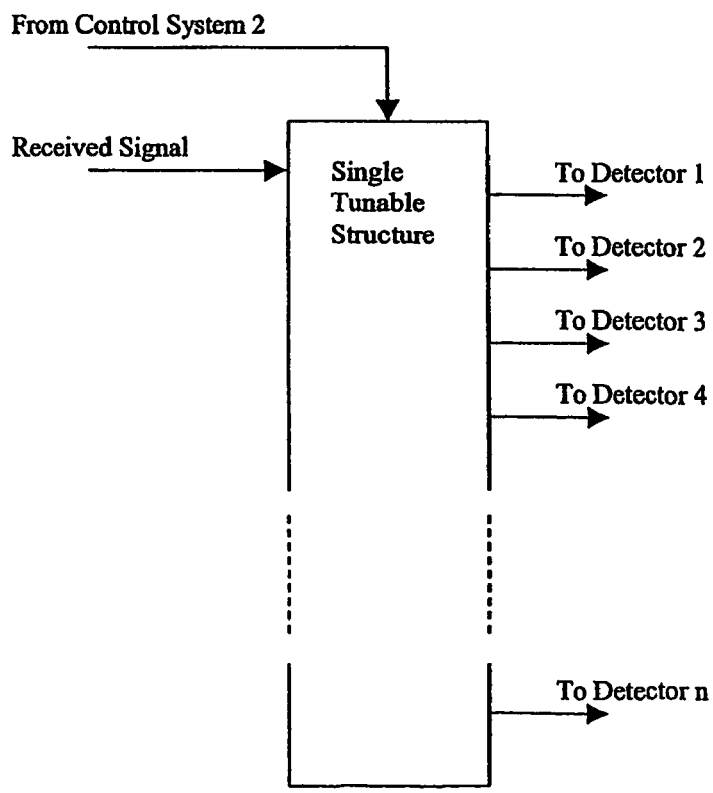
FIG. 5 illustrates a modification to the communications system of FIG. 3.

It is to be appreciated that tunable filters 1 to n could be replaced by a single tunable structure which demultiplexes all the signals in one go, e.g. suitably a tunable arrayed waveguide grating. Schematically, such a structure would be represented as shown in FIG. 5.

The following issues arise with the modulation scheme according to the present invention shown in FIG. 2. The flyback part of the sawtooth would present difficulties for various reasons (including dispersion, see below). This could be addressed by using a pair of sources and a pair of detectors, and switching between them. Thus, in the block schematic of FIG. 3: each tunable source 1 to n would comprise a pair of tunable sub-sources that would alternately generate the next successive sweep of the channel; and each tunable filter 1 to n would comprise a pair of tunable sub-filters each tracking a respective one of the corresponding pair of tunable sub-sources. This need not involve any loss of power and could be addressed in integrated units. The flyback could also be an issue because of the need not to lose bits. This could be addressed using some deliberate overlap and/or by synchronizing the sawtooth to the bit stream.

There will now be considered the effect of dispersion on the modulation scheme according to the present invention shown in FIG. 2.

The FIG. 2 modulation scheme has a somewhat more complex response to fibre dispersion (drift of system delay with optical frequency/wavelength) than a simple WDM system. For the purposes of illustration consider a synchronous WDM system as shown in FIG. 6. The effect on this of significant dispersion is to produce a skew as shown in FIG. 7. This has little impact on the system since channels are not generally expected to be synchronous (some extra memory may be required at the edges). However, if the dispersion is sufficiently large then the individual pulses will start to merge into one another, destroying the data.

The response of the FIG. 2 modulation scheme is somewhat similar, see FIG. 8. However, it is to be understood that the sawtooth channel path is skewed too. This can result, as shown in FIG. 8, in the channel being present twice at some times, see the overlap on the time axis of the two sweeps shown in FIG. 8. With reference also to the block schematic of FIG. 3, this problem can be addressed by arranging for each tunable filter 1 to n to comprise a pair of tunable sub-filters that would alternately track the next successive sweep of the channel. The channel would then be reconstructed by interleaving the output from the two sub-filters.

It is to be realised that the skewing of the sawtooth channel also has a benefit. In both prior art WDM and the modulation of the present invention, dispersion will cause the individual pulses to spread. However, in the present invention the space between the pulses also increases, so that the pulse train as a whole is 'stretched'. Hence, the pulse train can still be decoded, rather than blending into itself This advantage is not quite without price, because the instantaneous number of channels has also increased (by squeezing all channels a little closer together).

It is to be noted that the precise behaviour of any given system will depend upon the relative bit and sweep rates. However, even if the sweep is 'fast' (i.e. the frequency sweep in a bit period is greater than the pulse spectral width) the behaviour is relatively simple in that the pulses and the pulse train expand and collapse together.

The modulation of the present invention requires relatively fast sweeps (say up to 100 nsec/5300 GHz) to avoid excessively long delays in channel-swapping units. This is achievable using tunable lasers, and requires a fast tunable receiver (suitably an acousto-optic system). Alternatively, longer (fibre) delays can be accepted, with the full 5300 GHz being swept in a number of separate blocks, or tunable lasers could be used as local oscillators in coherent receivers.

The invention claimed is:

1. A communications system, comprising:
   a) a plurality of tunable signal sources, each for generating a carrier signal of any one of a plurality of wavelengths;
   b) first control means for controlling the signal sources so as to sweep the wavelength of the carrier signal generated by each source through the plurality of wavelengths, said first control means sweeping the signal sources in staggered manner so that at any point in time the signal sources are generating different wavelength signals;

c) a plurality of modulators, each for modulating information onto the swept carrier signal generated by a respective said signal source;

d) means for combining the swept modulated signals to form a combined signal and transmitting the combined signal;

e) means for filtering the received combined signal to extract therefrom a plurality of component signals, a component signal being extracted at each of the plurality of wavelengths, said filtering means comprising a plurality of tunable filters, each for filtering the received combined signal to extract a said component signal at one of the plurality of wavelengths;

f) second control means for controlling the filtering means so as to sweep the wavelength of each component signal extracted through the plurality of wavelengths, said second control means sweeping the wavelengths of the component signals in staggered manner in synchronism with said sweeping of the signal sources by the first control means, the wavelength of each component signal thereby tracking the wavelength generated by a respective said tunable signal source, said second control means controlling the tunable filters so as to sweep the wavelength of the signal component extracted by each filter through the plurality of wavelengths, said second control means sweeping the filters in said staggered manner in synchronism with said sweeping of the signal sources by the first control means, each said tunable filter thereby tracking the wavelength generated by a respective said tunable signal source; and g) a plurality of demodulators, each for demodulating a respective said component signal provided by a respective said tunable filter of the filtering means thereby to recover information contained therein.

2. The communications system according to claim 1, wherein each said tunable filter comprises a pair of tunable sub-filters that alternately track the next successive sweep of the tunable signal source corresponding to that said tunable filter.

3. The communications system according to claim 1, wherein each said tunable signal source comprises a pair of tunable sub-sources that alternately generate the next successive sweep of that said tunable signal source, and each said tunable filter comprises a pair of tunable sub-filters each tracking a respective one of the pair of tunable sub-sources of the corresponding said tunable signal source.

* * * * *